Oct. 19, 1954     C. C. BRYAN     2,692,291

MANUFACTURE OF VANILLIN FROM LIGNIN

Filed June 6, 1950     2 Sheets-Sheet 1

INVENTOR,
COLLIS C. BRYAN,
BY
ATTORNEY.

Oct. 19, 1954

C. C. BRYAN 2,692,291

MANUFACTURE OF VANILLIN FROM LIGNIN

Filed June 6, 1950

INVENTOR,
COLLIS C. BRYAN,
BY
ATTORNEY.

Patented Oct. 19, 1954

2,692,291

UNITED STATES PATENT OFFICE 2,692,291

MANUFACTURE OF VANILLIN FROM LIGNIN

Collis C. Bryan, Seattle, Wash., assignor to Monsanto Chemical Company, St. Louis, Mo., a corporation of Delaware Application June 6, 1950, Serial No. 166,393

8 Claims. (Cl. 260—600)

This invention relates to an improved process for the production of vanillin by the partial oxidation of lignin. More particularly, this invention relates to the production of vanillin in substantially increased yields by an improved process for the controlled and partial oxidation of the lignosulfonic acid compounds contained in waste sulfite liquors by the contacting of such lignosulfonic compounds with molecular oxygen under strong alkaline conditions.

It is known that vanillin may be produced from lignin or from derivatives of lignin such as are present in waste sulfite liquors by treating the lignin derivatives present in waste sulfite liquors with molecular oxygen in a strong aqueous solution of caustic soda during a moderately high temperature and pressure autoclave cooking process. The lignin in the waste liquors from sulfite digestion processes is present in the form of lignosulfonic acid compounds of high molecular weight. In order to break down these large complex molecules and create favorable conditions for oxidation of their fragments to vanillin, a rather drastic cooking procedure is used involving treatment of the lignosulfonic acid compounds in aqueous solution with a high concentration of caustic soda for a considerable period of time and at moderately high temperatures and under pressure in an autoclave. As a result of this severe treatment, it is believed that rather extensive fission to smaller molecular fragments occurs, especially in the early part of the reaction, and it has been considered that this breakdown of the molecule facilitates oxidation of the lignin to produce a commercially useful yield of vanillin. The most generally used and the most economical source of oxygen for the oxidation of the lignin, has been atmospheric air, although the use of substantially pure or commercial oxygen has been recommended, but the resulting yields which have been obtained by the use of the processes heretofore known have been undesirably low. In order to secure intimate contact between the molecular oxygen of the air and the liquid aqueous mixture of lignosulfonates and the caustic soda being cooked in the autoclave, the practice of the prior art has been to continuously and directly contact the alkaline liquid reaction mixture with the atmospheric air by discharging the air directly into the alkaline liquid reaction mixture and bubbling the air through the liquid reaction mixture, and while continuing to pass additional fresh atmospheric air into the liquid mixture to also repeatedly recirculate the residual gases escaping the liquid mixture back through the liquid mixture in an effort to utilize as much as possible the available molecular oxygen originally contained in the atmospheric air. These prior art processes have made no effort to control the partial pressure of the oxygen in the oxygen containing mixture of gases being contacted with the liquid phase reaction mixture throughout the course of the reaction since the prior art has not regarded the partial pressure of oxygen throughout the reaction as being critical, either as regards the process as a whole or as to any particular stage of the process. The practice has been that after a certain predetermined quantity of oxygen has been consumed or reacted with the lignin or lignin derivatives, the maximum yield of vanillin was considered to have been obtained providing that the prescribed ratio of ingredients in the charge and the temperature, pressure and time requirements had been observed; however, it was never recognized that either the rate of supply or the partial pressure of the molecular oxygen within the autoclave influenced the vanillin yield. Moreover, the resulting yields have been much less than those obtained by the process of this invention.

The main objective of the present invention therefore is to substantially increase the yield of vanillin obtainable by the oxidation of the lignosulfonic acid compounds which are available as low cost raw material in sulfite waste liquor. Another object is to utilize more effectively the oxygen content of atmospheric air to provide the necessary oxidizing reactant. Another object is to control the partial pressure of oxygen throughout the reaction at optimum levels for maximum yields of vanillin. Another object is to reduce the cost of manufacturing synthetic vanillin by improving the efficiency of the process. Another object is to reduce the total heat input required for the reaction. Other objects and features of the invention will be apparent from the subsequent disclosure.

It is therefore one of the novel embodiments of the present invention to control the partial pressure of the oxygen within rather narrow limits throughout the entire reaction and to vary these limits during different stages of the reaction in direct relation to the conditions favoring fission of the lignin molecule as it undergoes controlled progressive oxidative degradation during the progress of the cooking treatment.

In the presence of an alkali such as sodium hydroxide, 4-hydroxy-3-methoxy benzaldehyde, more commonly called vanillin, forms a sodium salt through the 4-hydroxy group, and it is this sodium salt that is herein referred to by the phrase "sodium vanillinate." The discovery has now been made that substantially increased yields of vanillin in the form of sodium vanillinate are readily secured if the partial pressure of the molecular oxygen of the oxygen-containing gaseous mixture which is used to contact the lignin materials in the aqueous alkaline solution is controlled and maintained within critical limits throughout the autoclaving operation. Furthermore, it has now been found that the optimum partial pressure for the oxygen may be substantially higher during the early stages of the reaction but that the optimum partial pressures of oxygen must diminish rapidly to low and critical levels as the reaction proceeds. A novel embodiment of this invention is that the reaction conditions during the early heating period of the cook, previously neglected, have been found to be critical. Furthermore, in contradistinction to prior practice it has now been discovered that greatly increased yields of vanillin may be obtained if the lignin derivatives are not in contact with undiluted atmospheric air except during a very short period in the initial stage of the reaction. Due to this important discovery, in the process of the present invention, it has been found preferable to treat the lignin materials throughout the reaction with air which has been diluted with inert gases such as nitrogen or steam below the normal (about 20%) oxygen content before this oxidizing gas is ever allowed to come into intimate contact with the liquid reaction mixture within the autoclave.

The nature and properties of the charge suitable for the autoclave treatment of sulfite waste liquors by the present invention may be varied over wide limits and still the advantages of increased yields may be realized, however, there are preferred materials, proportions and conditions which make maximum yields possible.

The lignin-containing raw material may be selected from natural materials or waste lignin-containing materials from other manufacturing processes. While most waste products which are rich in lignin are suitable and useful as raw materials for the present process, it is advantageous to employ lignin-containing materials which are relatively free from cellulose, and therefore, waste liquors as discharged from sulfite pulping processes are especially desirable, and in particular, those which have had their content of non-lignin materials further reduced by passing the waste sulfite liquors through an alcohol process for the fermentation conversion of the constituent carbohydrate to alcohol. The effluent liquors from such an alcohol process is an acid solution of calcium lignosulfonates wherein the dissolved solids content of the liquors will analyze 50% or better as lignin, and such waste sulfite liquors are the preferred lignin-containing raw materials for the process of this invention.

The phrase "sulfite liquor solids" or the term "solids" alone when used in the sense of the "solids of lignin-containing liquors" is used herein in describing and claiming the process of this invention to mean and to include the total amount of normally solid materials which are present in the liquors either in solution or present as undissolved residue; however, substantially all of the "solids" or the "solids content" of sulfite liquors are actually dissolved normally solid materials in solution in the liquors. For example, a waste sulfite liquor containing "10% sulfite liquor solids" generally will contain very little or no filterable undissolved materials or residue, however, upon evaporating 100 pounds of such a waste sulfite liquor to dryness, there would remain 10 pounds of solid materials as a residue, and in the case of waste sulfite liquor solids, about 50% of the "solids" would be lignin in the form of a lignosulfonic acid derivative.

It is preferred to operate on a lignin-containing material in a more concentrated condition than the dilute solutions in which the lignin exists in the original waste sulfite liquors, for while such liquors at their original low concentrations may be used and equivalent yields may be obtained, these liquors incur economic disadvantages due to their greater dilution. The solids concentration of such liquors may run as low as 4%; therefore, it is preferred to evaporate such liquors to a concentration of the order of 8 to 12% solids (about 7 to 12 parts by weight of liquor per part of sulfite liquor solids) and use the liquors in this range of concentration as the starting raw materials for the improved process of this invention.

With respect to the caustic soda (sodium hydroxide)-lignin ratio, the process of this invention gives comparatively high yields when the ratio of caustic soda to waste sulfite liquor solids is of the order of 70 to 120 parts by weight, and preferably 70 to 80 parts by weight, of caustic soda per 100 parts by weight of waste sulfite liquor solids. Potassium hydroxide (caustic potash) may be substituted for all or part of the sodium hydroxide as the source of alkalinity. However, the highest yields have been obtained using sodium hydroxide rather than potassium hydroxide.

It is also pointed out that copper and certain copper compounds are effective oxidation catalysts for promoting the partial oxidation degradation of the lignin molecule. A recommended copper catalyst is copper sulfate and a suitable copper catalyst-sulfite waste liquor solids ratio is about 2 to 4 parts by weight of copper sulfate pentahydrate per 100 parts by weight of waste sulfite liquor solids. This ratio is not highly critical and considerably more copper sulfate may be equally well employed if desired, as the copper oxide is easily recoverable from the residues for reuse. Metallic copper, such as copper turnings in the strongly alkaline liquors is also an effective catalyst. The use of a copper catalyst is not necessary to realize the increased yields and other advantages of this process of this invention; however, in some cases a copper catalyst will aid in reaching a maximum yield.

The temperatures favoring the fission and partial oxidation of the lignin molecule to produce sodium vanillinate are within the range of from about 100° C. up to a maximum of about 185° C. In general, the period of time that the temperatures are below 140° C. may be referred to as the "heating up period" and the period of time that the temperatures are within the range of about 140 to about 185° C. may be referred to as the "cooking period." The preferred temperature range for the cooking period is about 140 to about 170° C. and 165° C. has been found to be about the optimum temperature for the cooking period.

During the heating up period, during which time the reaction mixture is heated up from ambient temperature to a temperature within the range of 140 to 185° C., it is believed that the main fission reaction is initiated at about 100° C. The rate of heating during the heating up period is preferably controlled so that within about one hour the contents of the autoclave are brought up to a temperature within the range of 140 to about 185° C., and has been pointed out, preferably 140 to 170° C., and the contents are maintained at these temperatures for a cooking period which may vary according to the conditions employed from about 30 minutes to about 4 hours, and preferably about 3 hours.

Throughout the entire heating up and cooking period the contents of the autoclave, which is a liquid aqueous alkaline mixture of a lignin material, is continuously and intimately contacted with an oxidizing gaseous mixture containing molecular oxygen in a manner as will be described.

It is an important and extremely critical embodiment of this invention that the partial pressure of the molecular oxygen of the oxidizing gaseous mixture be controlled and adjusted to within critical limits before this oxidizing gaseous mixture is permitted to contact the liquid contents of the autoclave and that these critical limits vary during the different stages as the lignin molecule undergoes progressive oxidation degradation during the progress of the heating up and cooking periods.

In the case where waste sulfite liquor salts are used as the source of lignin, the lignin is present as a lignosulfonate which is a large molecule of high molecular weight. During the initial heating up period there seems to be little change in the lignosulfonate molecule until a temperature of about 100° C. is exceeded, but shortly thereafter it is believed that these large lignosulfonate molecules progressively split up into relatively small fragments which are highly reactive and which in the presence of proper amounts of oxygen and proper conditions, as provided by this invention, form high yields of sodium vanillinate, which is easily converted to vanillin; however, if insufficient oxygen is available numerous and complex and wide reactions and recombinations occur resulting in low vanillin yields; whereas if excessive oxygen is available the fragments of the lignin molecule will be oxidized and even the vanillin itself will be further oxidized resulting in low yields of vanillin.

It has now been discovered that an oxygen partial pressure as high as 20 pounds per square inch is permissible where the temperature is 100° C. or below in the heating up period and reduced continuously from there to about 2.5 pounds per square inch by the time 140° C. is reached to obtain the highest yields of vanillin. The partial pressure of the oxygen must be reduced to low and critical levels after this initial fission has taken place in order that the fragments will not be over-oxidized with resulting low vanillin yields.

While it would be most difficult to follow the progressive degradation of the lignin molecule and determine the degree of degradation at any particular instant, the conditions which are set out as being a part of this invention permit reproducible high yields of vanillin and these conditions appear to be highly favorable for the progressive degradation of the lignin molecule.

During the initial heating up period when the temperatures are within the range of about 100° C. to about 140° C., that is, when the initial fission is taking place, the partial pressure of oxygen should be above 0.5 pound per square inch and may desirably be within the continuously descending range of 20 to a pressure of the order of 0.5 pound per square inch and more desirably within the range of 6.6 to 0.5 pound per square inch during a substantial portion of the heating up period; however, during a predominant part of the entire cooking period, wherein the lignin molecule fragments are oxidized to vanillin, the temperature should be maintained within the range of 140 to about 185° C. and the partial pressure of oxygen reduced to within the range of 2.5 to 0.075 pound per square inch and the cooking continued under these conditions for about ½ to 4 hours. Preferred conditions for the cooking period are a temperature range of 140 to 170° C. and an oxygen partial pressure of 1.5 to 0.075 pound per square inch; an optimum operating point for the cooking period has been found to be about 165° C. and 0.5 pound per square inch for the oxygen partial pressure and for a time period of about 3 hours.

For the details of the equipment which may be utilized to carry out the process of this invention, with the essential features of control, reference is made to the accompanying drawings.

Figure 1 is a schematic drawing of an arrangement for the autoclave and auxiliary equipment utilizing atmospheric air as the source of oxygen and making use of the vapor space (head space) within the autoclave as a mixing chamber to secure proper dilution of the air (oxygen) with inert gases before the oxygen is allowed to intimately contact and act on the liquid reaction mixture containing the lignin material in the lower portion of the autoclave.

Figure 1:
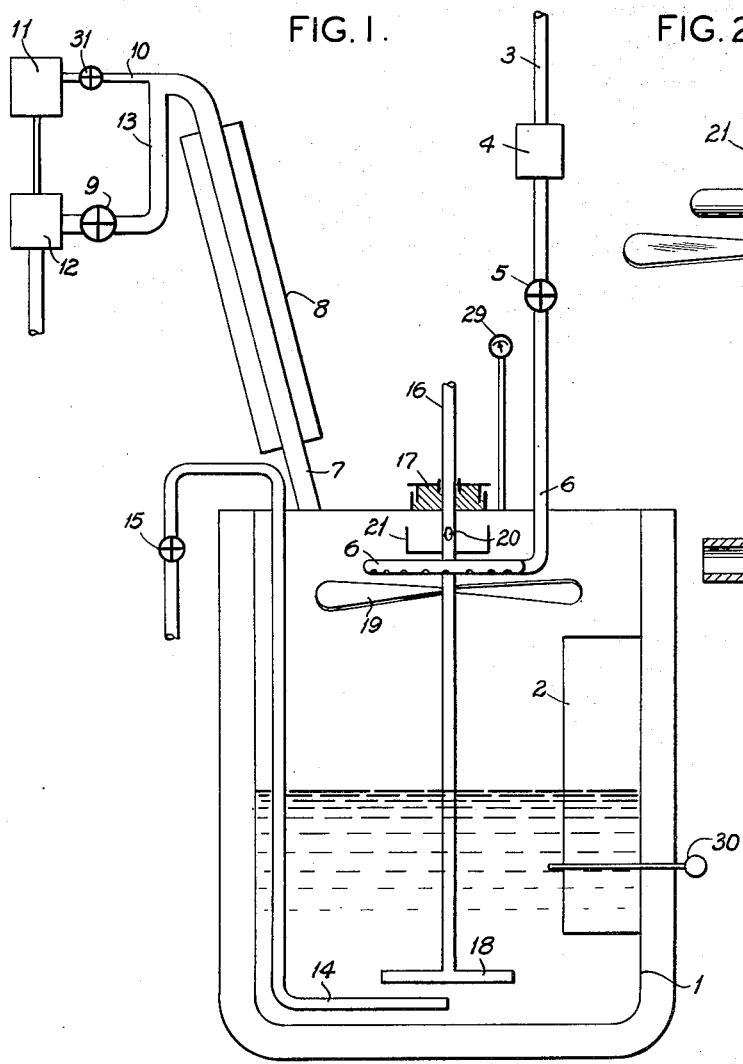

Referring to Figure 1: 1 represents the shell of the autoclave which is a conventional, externally heated, pressure vessel designed to operate safely at pressures up to 250 pounds per square inch. 2 is a baffle attached to one wall of the autoclave to improve the mixing and contacting of the gases and liquid reaction mixture. 3 is an air inlet pipe to supply compressed air from a source not shown. Conveniently, inlet pipe 3 is led through flow meter 4 and thence through control valve 5 into the autoclave where it connects with perforated distributor ring 6 located in the upper part of the vapor space so as to deliver an evenly distributed air supply. 7 is a gas outlet pipe passing through a reflux condenser 8 and thence to back pressure control valve 9. Just ahead of back pressure control valve 9, a very small proportion of the gas is led through sampling pipe 10, control valve 31 and thence through continuous indicating oxygen analyzer 11 and thence to gas flow meter 12. The flow of gas from back pressure valve 9 along with the discharge from oxygen analyzer 11 passes through pipe 13 into gas flow meter 12 and the combined gases are blown to waste after they pass out of the meter. Leading from the bottom of the autoclave, blow down pipe 14 is provided with control valve 15 for emptying the autoclave after the reaction is completed. Centrally located in the head of the autoclave is the shaft of a gas disseminator or sparger 16 which assembly is revolved by an external source of power not shown. The shaft passes through stuffing box 17 and thence into the autoclave. The shaft is solid until it passes through stuffing box 17. Below stuffing box 17, the shaft is hollow and at its lower end is connected to open-ended hollow cross-arm 18. On the upper part of sparger shaft 16, just below air distributor ring 6, mixing propeller 19 is located to assist in mixing the gases in the vapor space of the autoclave. At the upper end of the hollow space in sparger shaft 16, opening 20 is provided through which mixed gases from the vapor space can be drawn down through the hollow shaft by the suction created by the rotation of the open-ended revolving cross-arm 18. Cup-shaped baffle 21 is also attached to sparger shaft 16 at a point below opening 20. The upper lip of cup 21 extends fairly close to the upper shell of the autoclave so that only well mixed gases can be drawn into the sparger shaft through opening 20. Pressure gauge 29 indicates the total gas pressure within the autoclave. Thermometer 30 indicates the temperature of the reacting material.

Figure 2:
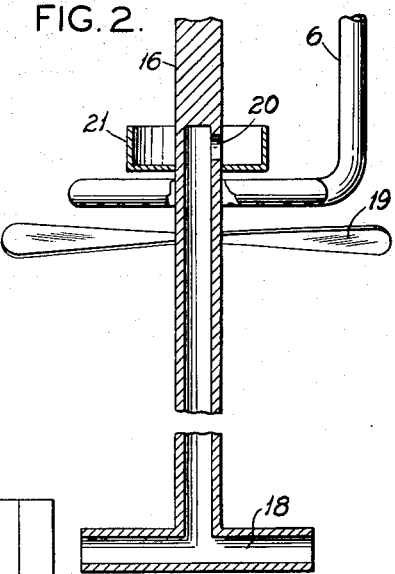
Figure 2 is a section of the gas disseminator or sparger used in Figure 1 to break up and distribute the gases as fine bubbles below the surface of the liquid and thereby intimately contact the liquid reaction mixture with gases containing molecular oxygen.
Figure 3:
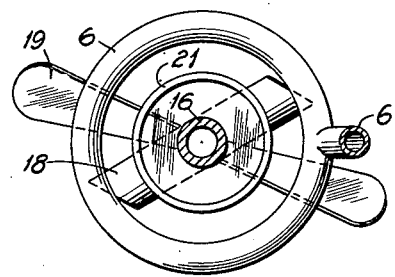
Figure 3 is a plan view of the same.

Figures 2 and 3 show an enlarged view of sparger 16 and air distributor ring 6 so that their relationships can be more clearly understood.

Figure 4:
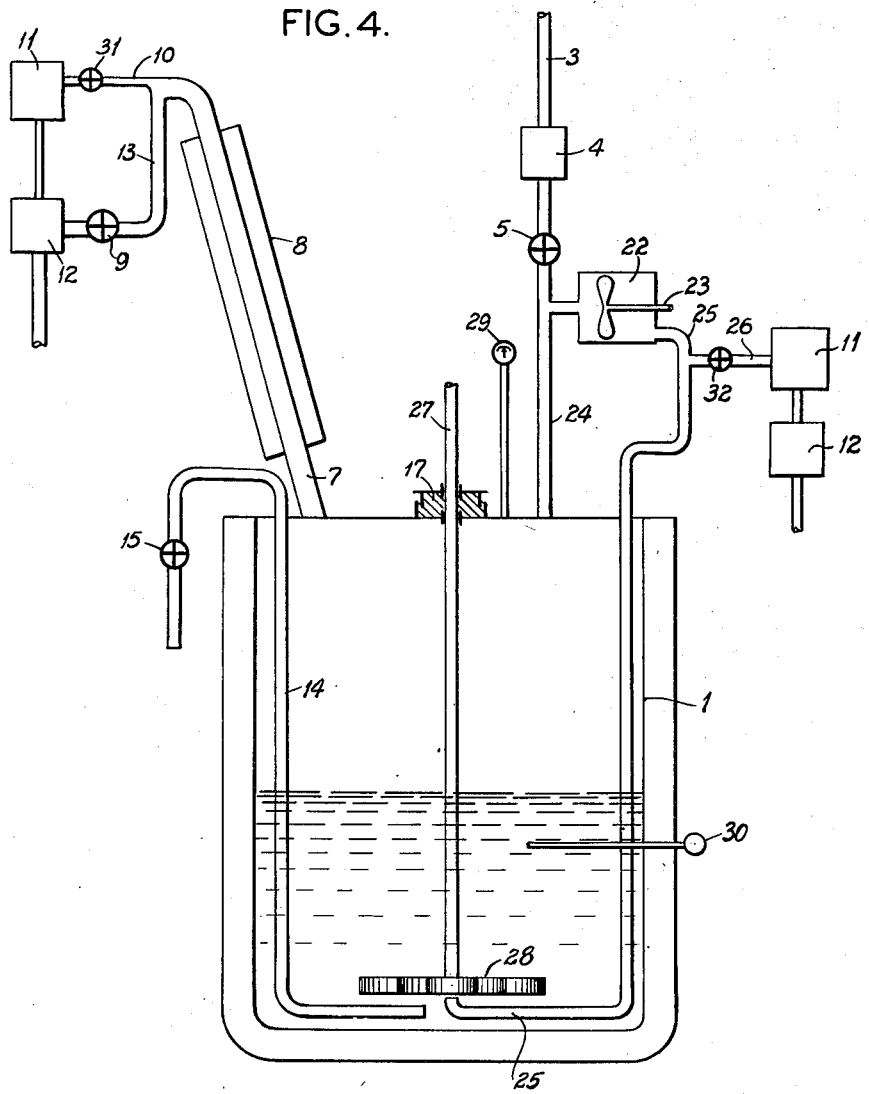
Figure 4 is a schematic drawing of an alternating arrangement for the autoclave utilizing an external mixing chamber for providing proper mixture of molecular oxygen and inert gases in conjunction with a turbine disseminator to break up the gases into fine bubbles below the surface of the liquid reaction mixture.

Referring to Figure 4: This schematic drawing illustrates an alternative arrangement of an autoclave and auxiliary equipment, employing a turbine distributor for disseminating externally premixed air and inert gases as fine bubbles through the liquid instead of the sparger arrangement of Figure 1. Describing the arrangement in detail: 1 is the shell of the autoclave which does not require a baffle as in Figure 1. 3 is an inlet pipe for compressed air supplied from an outside source, not shown, passing through flow meter 4 and control valve 5 and thence to mixing chamber 22 within which is provided revolving circulating and mixing fan or blower 23. Mixing chamber 22 received steam and spent gases drawn from the vapor space in the autoclave through supply pipe 24 by the pressure gradient created by fan or blower 23. Mixing chamber 22 also discharges a mixture of air and spent gases through outlet pipe 25 which leads into the autoclave and discharges centrally near the bottom of the liquid space. Sampling pipe 26 also draws a sample of the mixed gases from pipe 25. This small portion of the gases passes through control valve 32 and then is passed through oxygen analyzer 11 and gas flow meter 12 and thence to waste. Also connected to the top of the autoclave is exhaust pipe 7 passing through the same parts as shown in Figure 1, namely; reflux condenser 8, back pressure valve 9, oxygen analyzer 11, and gas flow meter 12. Blow-down pipe 14 and control valve 15 are also provided, the same as shown in Figure 1. In place of revolving sparger 16, as shown in Figure 1, the autoclave illustrated in Figure 2 is provided with a solid turbine shaft 27 which leads down through the head of the autoclave, passing through stuffing box 17 and terminating in turbine gas disseminator 28 located centrally near the bottom of the autoclave directly above the termination of gas mixing pipe 25.

Figure 5:
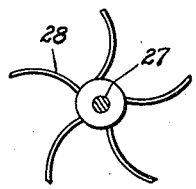

A plan view of turbine 28 is shown in Figure 5.

Where the reaction is carried out in the sparger-equipped autoclave, illustrated in Figure 1, the method of operation is as follows. It is assumed that the autoclave is externally heated and that an input of heat can be supplied through the shell sufficiently rapidly so that, after the temperature of 100° C. is reached (which is the point at which the first evidences of reaction can be observed), the temperature of the mass can be raised to the full operating temperature, preferably about 165° C., in about one hour.

The volume of liquid material charged into the autoclave is preferably adjusted so that it will occupy about 40% of the total space, leaving the upper 60% in the autoclave as vapor space which, under the conditions to be described, is utilized as a mixing chamber for mixing incoming air and inert gases so as to prevent the sparger drawing down and discharging into the reacting liquid any gas which has not had the partial pressure of the molecular oxygen adjusted to the levels as required by this invention. The oxygen required for the reaction is supplied by compressed normal air injected through air supply pipe 3 and its volume is ascertained as it passes through flow meter 4, the amount of air injected being controlled by valve 5. As the air enters the autoclave, it is distributed over a considerable area surrounding the sparger shaft by being discharged through the perforations in air distributor 6, where it is immediately mixed with the steam and inert gases in the vapor space by the action of fan blades 19 which are attached to the sparger shaft. Discharge to the outside for venting waste gases is provided through vent pipe 7 and controlled by back pressure valve 9. In order to prevent costly waste of heated gases, the discharge is always kept to the minimum required to permit the essential desired oxygen partial pressure to be maintained without building up excessive pressure in the system.

In order to continuously condense and return to the reaction liquid material derived from the cook, reflux condenser 8 is provided surrounding vent pipe 7. In order to obtain the essential information for controlling the reaction, the volume of gases vented through vent pipe 7 is measured by passing through flow meter 12 and, by means of bypass 10, a small proportion of the gases is passed through oxygen analyzer 11 which continuously indicates the percent of oxygen in the discharge.

Sparger 16 is continuously revolved during the reaction and it will be understood that the rate at which it is revolved will control the volume of gases which is discharged into the liquid and the approximate number of times that the gases in the vapor space of the autoclave are recirculated through the liquid. The sparger, therefore, is assumed to be provided with a power source of variable speed. Owing to the arrangement of baffle 21 in relation to the top of the autoclave and to opening 20 in the sparger shaft, the gases, which are drawn into the sparger shaft, are circulated down through the liquid and up again through the vapor space and always thoroughly mixed so that pure incoming air cannot contact the reacting liquid. The original air supply is preferably from an air compressor receiver containing air at pressure higher than any pressure which is used in the autoclave. It will thus be seen that, by proper operation of control valve 5 and back pressure valve 9, in conjunction with the volume of fresh air which is allowed to enter (as shown by flow meter 4) and the volume of spent gases discharged (as shown by flow meter 12) and the percent oxygen in the discharged gases (as indicated by oxygen analyzer 11) and the total gas pressure on the autoclave (as indicated by gauge 29), the oxygen partial pressure of the gases discharged through the liquid by sparger 16 can be both ascertained and controlled. Varying the speed of sparger 16 can also be used to some extent to modify the partial pressure of the oxygen available for the reaction.

In commercial practice, automatic controls would be provided so that the reaction would proceed under predetermined optimum conditions with improved results over hand control due to improved accuracy of operation.

Alternately, if the type of autoclave illustrated by Figure 4 is employed, the controls and method of operation are similar. The principal difference is that, instead of using a hollow shaft sparger which draws mixed gases down from the vapor space and then bubbles them through the liquid as described above, a solid shaft carrying a submerged turbine is utilized as the air distributor and the mixed gases to be distributed are piped down and discharged just under the center of the turbine after being premixed in an external mixing chamber so that the vapor space of the autoclave is not required as a mixing chamber.

Describing the arrangement in more detail: compressed air from an outside source is passed into the system through pipe 3, through flow meter 4, under control of valve 5, but, instead of discharging this air directly into the vapor space of the autoclave as described in Figure 1, it is discharged into mixing chamber 22. Also discharging into mixing chamber 22 is pipe 24 supplying steam, vapor and spent gases taken from the vapor space in the autoclave. Within the mixing chamber, these gases are mixed and forced out of the chamber by propeller 23 through pipe 25 leading down to the bottom of the autoclave and discharged into the liquid under the center of the turbine. A small branchpipe 26 also discharges a small sample of the mixed gases to waste through oxygen analyzer 11 and flow meter 12. The venting system of this autoclave is identical to that described in Figure 1.

It will thus be seen that the same elements of control, as are described in Figure 1, are available so that the partial pressure of the oxygen in the gases which are bubbled up through the liquid can be accurately controlled and, furthermore, effective provision is available to prevent air having the full 20% oxygen content being allowed to be distributed through the liquid.

An alternative method of operation may be used where a series of autoclaves is employed to break the reaction up into successive treatment stages utilizing one or more of such stages for the heating up and cooking periods and thereby operate continuously. There may conveniently be 3, 4 or 5 autoclaves in the series and each autoclave may be of either of the foregoing types and each of them will be provided with individual controls so that the oxygen partial pressure in each autoclave can be closely and individually controlled according to the conditions required for each stage. The method of operation would consist in continuously supplying the initial reaction mixture to the first autoclave and continuously passing it forward to successive autoclaves until the reaction is completed. By proper flow control, it will of course be readily possible to regulate the average dwell time of the reaction mixture in each autoclave and under the desired conditions for each autoclave.

The following examples illustrate the practice of the invention under a variety of conditions, however, it will be understood that invention is not limited solely to the conditions as shown in the following specific examples but rather there are permissible variations in these conditions which have been herein described.

While it has been pointed out that various types of lignin or lignosulfonic acid compounds may be processed by the method of the present invention, a preferred material is, as has been stated, a waste sulfite liquid from a softwood sulfite digestion process which has been passed through a fermentation process and stripped of fermentable carbohydrates. Waste sulfite liquor made from hardwoods or other dicotyledons will give rise to syringaldehyde and derivatives in addition to vanillin and vanillic acid. This preferred softwood material was used in carrying each of the following examples and these waste sulfite liquor solids contained about 50 to 52% lignin. In each of the following examples, the initial reaction mixture was prepared with the same components and the same concentrations in order to provide a good comparative basis. The initial reaction mixture in each of the following examples contained for each part by weight of waste 0.0267 sulfite liquor solids, 8 parts of water and 0.8 parts of caustic soda and 0.0267 parts of copper sulfate in Examples 2, 4, 5 and 7 and the autoclave in each instance was filled to about 40% of its volume with this initial reaction mixture leaving about 60% of the volume of the autoclave as head space for the oxidizing gases containing the molecular oxygen which are intimately contacted with the reaction mixture.

In considering the results set out in each of the examples, it should be remembered that in prior processes for producing vanillin as sodium vanillinate by the oxidation of a caustic soda solution of waste sulfite liquor solids, maximum yields of 6 to 6½% vanillin based on the waste sulfite liquor solids have been obtained.

On the assumption that the waste sulfite liquor solids which have been used in the prior art processes contained about 50 to 52% lignin, which is an average figure, the yield of vanillin by the prior processes when based on the lignin content of the waste sulfite liquor solids would be about 12 to 13%. The processes of this invention makes it possible to obtain reproducible high yields of vanillin in excess of 8% and often times even exceeding 10%, based on the waste sulfite liquor solids charged, and on the basis of the lignin content of those solids, this would be the equivalent of yields of the order of 16 and even exceeding 20% vanillin.

All of the runs which are set out in the following examples were made in an autoclave having auxiliary equipment as shown in the schematic diagram of Figure 1. During the reaction, the sparger was operated at between 1100 R. P. M. and 1250 R. P. M. In the equipment which was used, this speed of the sparger produced a strong flow of gases from the vapor space down into the liquid so that most of the gases passed through and recirculated through the liquid reaction mixture from 15 to 30 times. The speed of the sparger and the amount of recirculation of the gases through the liquid will, of course, have to be varied according to the particular design of the equipment which is used.

Yields of vanillin were determined in all cases by analysis of the sodium vanillinate content of the final reaction mixture. Compressed air was used as a source of oxygen and was obtained from the receiver of an air compressor which was maintained at a pressure of about 200 pounds per square inch.

The gauge pressure shown on the autoclave during operation of course indicates merely the sum of the steam pressure due to the heat and the superimposed gas pressure due to injected air supply. In the following examples, the gauge pressure varied from about 120 to about 175 pounds per square inch. However, it is emphasized that the gauge pressure is merely incidental. The essential feature is to supply and maintain the correct input of air to obtain the desired partial pressure of oxygen during the reaction. It will be seen that with any given steam pressure due to heat, the desired partial pressure of oxygen can be obtained with various gauge pressures above the steam pressure according to the input of air into the system the extent of recycling of the diluted oxygen-containing gas through and in intimate contact with the reacting mixture within the autoclave, and the amount of spent gas which is being exhausted from the system.

The vanillin is present in the final reaction mixture in the form of sodium vanillinate which can be separated from the reaction mixture and converted to vanillin by any one of several known methods. For example, the sodium vanillinate itself can be extracted from the final reaction mixture with a preferential solvent such as isopropyl alcohol, isopropyl alcohol may then be separated from the sodium vanillinate by distillation and the sodium vanillinate converted to vanillin by acidification. Thereafter, the vanillin may be purified by distillation or crystallization from a solvent, or both means may be used, to produce a USP grade of vanillin. On the other hand, the final reaction mixture itself may be acidified thereby converting the sodium vanillinate to vanillin and the vanillin thereafter extracted by means of a preferential solvent such as toluene. The toluene may then be separated from the vanillin by distillation and further purified by fractional distillation or crystallization from a solvent, or both means may be used, to produce a USP grade of vanillin.

Example I

An autoclave which was equipped with auxiliary equipment as shown in the schematic diagram of Figure 1, was filled to about 40% of its volume with an initial liquid reaction mixture that contained for each part by weight of waste sulfite liquor solids, 8 parts of water and 0.8 part of caustic soda. The autoclave was then closed and heated so that in the first 15 minutes of the heating up period the temperature was raised to 131° C. and during which time the partial pressure of the molecular oxygen in the gases contacting and passing through the reaction mixture was maintained at an average of 3.36 pounds per square inch. During this initial 15 minute period, 12.0 parts by weight of oxygen were consumed by the reaction for each 100 parts of lignin. During the next 15 minute interval, the temperature was increased to about 143° C. and during this interval the partial pressure of the oxygen in the gases contacting the liquid reaction mixture was lowered to below 1.5 pounds per square inch and it was determined that in this initial 30 minute period a total of 14.3 parts by weight of oxygen had been consumed per 100 parts of lignin. Thereafter, the reaction was continued and the gases in the vapor space above the liquid were continued to be circulated through the liquid reaction mixture while the temperature for the remainder of the cooking period was maintained within the range of 145 to 164° C. and the partial pressure of the oxygen in the gaseous mixture in the vapor space above the liquid, which is the same gaseous mixture contacting and being passed through the liquid reaction mixture, was maintained within the range of 0.15 to 0.50 pound per square inch by the addition of air into the vapor space and venting of gases in the manner as has been described, until successive analysis had indicated that a maximum yield of sodium vanillinate had been obtained. This maximum yield was reached at the end of a total of 4 hours from the time the heating of the autoclave was begun and during which time 51.3 parts by weight of oxygen had been consumed by the reaction per 100 parts of lignin. A determination of the sodium vanillinate in the final reaction mixture at the end of this 4 hour period indicated a yield of 9.7% vanillin, based on the waste sulfite liquor solids charged, had been obtained. When calculated on the basis of the lignin content of the waste sulfite liquor solids charged, this is equivalent to a yield of about 19% vanillin.

Example II

An autoclave was equipped with auxiliary equipment as shown in the schematic diagram of Figure 1 and was filled to about 40% of its volume with an initial liquid reaction mixture that contained for each pound of waste sulfite liquor solids, 8 pounds of water, 0.8 pound of caustic soda and 0.0267 pound of hydrated copper sulfate. The autoclave was then closed and heated so that in the first 15 minutes of the heating up period the temperature was raised to 121° C. and during which time the partial pressure of the oxygen in the gases contacting and passing through the liquid reaction mixture was maintained at an average of 8.5 pounds per square inch. During this initial 15 minute period, 8.8 parts by weight of oxygen were consumed by the reaction for each 100 parts of lignin. During the next 30 minute interval, the temperature was increased to about 141° C. and the partial pressure of the oxygen in the gases contacting the liquid reaction mixture was lowered to below 1.5 pounds per square inch and it was determined that in the initial 45 minute period, a total of 14.4 parts by weight of oxygen had been consumed per 100 parts by weight of lignin. Thereafter, the reaction was continued and the gases in the vapor space above the liquid were continued to be intimately contacted with the liquid reaction mixture by being circulated and bubbled through the liquid reaction mixture while the temperature for the remainder of the cooking period was maintained within the range of 140 to 168° C. and the partial pressure of the oxygen in the gaseous mixture in the vapor space above the liquid, which is the same gaseous mixture contacting and being passed through the reaction liquid mixture, was maintained within the range of 0.35 to 1.20 pounds per square inch by the addition of air into the vapor space and the venting of gases in the manner as has been herein described, until successive analysis had indicated that a maximum yield of sodium vanillinate had been obtained. This maximum yield was reached at the end of a total of 4 hours from the time of the heating of the autoclave was begun and during which time 51.8 parts by weight of oxygen had been consumed by the reaction per 100 parts of lignin. A determination of the sodium vanillinate content in the final reaction mixture at the end of this 4 hour period indicated a yield of 10.1% vanillin, based on the waste sulfite liquor solids charged, had been obtained. When calculated on the basis of the lignin content of the waste sulfite liquor solids charged, a yield of about 19.8% vanillin is indicated.

Example III

An autoclave equipped with auxiliary equipment as shown in the schematic diagram of Figure 1 was filled to about 40% of its volume with an initial liquid reaction mixture that contained for each pound of waste sulfite liquor solids, 8 pounds of water and 0.8 pound of caustic soda. The autoclave was then closed and heated so that in the first 15 minutes of the heating up period the temperature reached 120° C. and during which time the partial pressure of the oxygen in the gases contacting the liquid reaction mixture was maintained at an average of about 1.60 pounds per square inch. During this initial 15 minute period, 4.8 parts by weight of oxygen were consumed by the reaction for each 100 parts of lignin. During the next 30 minute interval, the temperature was increased to about 157° C. and during this interval the partial pressure of the oxygen in the gases contacting the liquid reaction mixture was lowered to below 1.5 pounds per square inch and it was determined that in this initial 45 minute period a total of 9.2 parts by weight of oxygen had been consumed per 100 parts of lignin. Thereafter, the reaction was continued and the gases in the vapor space above the liquid were continued to be intimately contacted with the liquid reaction mixture while the temperature for the remainder of the cooking period was maintained within the range of 163–167° C. and the partial pressure of the oxygen in the gaseous mixture in the vapor space above the liquid and being contacted with the liquid reaction mixture was maintained within the range of 0.20 to 0.35 pound per square inch until successive analysis had indicated that a maximum yield of sodium vanillinate had been obtained. This maximum yield was reached at the end of a total of about 4 hours from the time the heating of the autoclave was begun and during which time 51.8 parts by weight of oxygen had been consumed by the reaction per 100 parts of lignin. A determination of the sodium vanillinate in the final reaction mixture at the end of this 4 hour period indicated a yield of 9.0% vanillin, based on the waste sulfite liquor solids charged. When calculated on the basis of a lignin content of the waste sulfite liquor solids charged, this is equivalent to a yield of about 18% vanillin.

Example IV

An autoclave was charged with an initial reaction mixture as described in Example II and the closed autoclave was heated so that in the first 15 minutes of the heating up period, the temperature was raised to 129° C. and during which time the partial pressure of the molecular oxygen in the gases intimately contacting the liquid reaction mixture was maintained at an average of 1.30 pounds per square inch. During this initial 15 minute period, 4.0 parts of oxygen were consumed by the reaction per each 100 parts of lignin. During the next 15 minute period the temperature was increased to about 138° C. and the partial pressure of the oxygen in the gases intimately contacting the liquid reaction mixture was reduced to 0.95 pound per square inch and it was determined that in this initial 30 minute period, a total of 8.0 parts by weight of oxygen had been consumed by the reaction per 100 parts by weight of lignin. Thereafter, the reaction was continued for an additional hour while the temperature was maintained within the range of 145 to 161° C. while the partial pressure of the molecular oxygen in the gaseous mixture in the vapor space above the liquid which was being contacted with the liquid reaction mixture was maintained within the range of 0.55 to 0.70 pound per square inch. At the end of this time, a total of 90 minutes from the time the reaction mixture was begun to be heated, it was determined that 35.0 parts of oxygen had been consumed per 100 parts of lignin, and a yield of 8.3% vanillin as sodium vanillinate was obtained, based on the weight of the waste sulfite liquor solids charged. This is equivalent to a yield of about 16% vanillin based on the lignin content of the sulfite liquor solids.

Example V

An autoclave was again charged with an initial reaction mixture as was described in Example II, and the closed autoclave was heated so that the temperature of the liquid reaction mixture was raised to 136° C. in the first 15 minutes of the heating up period while the partial pressure of the oxygen in the gases contacting the liquid reaction mixture was maintained at about 2.20 pounds per square inch. At the end of this first 15 minutes of heating and reacting, it was determined that 7.0 parts of oxygen had been consumed by the reaction per 100 parts of lignin. During the next 15 minute period, the temperature was increased to 159° C. while the partial pressure of the oxygen in the gases contacting the liquid reaction mixture was reduced to 1.45 pounds per square inch and it was determined that at the end of this second 15 minute period that 15.5 parts of oxygen had been consumed per 100 parts of lignin. Thereafter, the reaction was continued for an additional hour while the temperature of the liquid reaction mixture was maintained within the range of 158 to 164° C. and the partial pressure of the oxygen in the gases being passed through the liquid reaction mixture was maintained within the range of 0.55 to 0.75 pound per square inch. At the end of this reaction period, which was a total of 90 minutes from the time the heating of the autoclave was begun, it was determined that 43.3 parts of oxygen had been consumed by the reaction per 100 parts of lignin and a yield of 8.2% vanillin, as sodium vanillinate and based on the weight of the sulfite liquor solids charged, was obtained. This is equivalent to about a 16% yield of vanillin based on the lignin content of the sulfite liquor solids charged.

Example VI

An autoclave was charged with a liquid reaction mixture such as was described in Example I and the closed autoclave was heated so that within the first 15 minutes the temperature of the liquid reaction mixture was raised to 130° C. and during which time the partial pressure of the oxygen in the gases contacting the liquid reaction mixture was maintained at about 0.07 pounds per square inch and during this time 0.7 part of oxygen were consumed by the reaction per 100 parts of lignin. During the next 45 minutes, the temperature was increased to 160° C.

while the partial pressure of the oxygen in the gases contacting the liquid reaction mixture was maintained at 0.01 pound per square inch. At the end of this first hour of operation, it was determined that a total of 2.5 parts of oxygen had been consumed by the reaction per 100 parts of lignin. Thereafter, for the next 3 hours of operation, the temperature of the liquid reaction mixture was maintained within the range of 163 to 164° C. while the partial pressure of the oxygen in the gases contacting the liquid reaction mixture was increased and maintained within the range of 0.30 to 0.47 pound per square inch, after which time the operation was stopped. It was then determined that during the 4 hour period from the time that the heating of the autoclave was begun, a total of 54.0 parts of oxygen had been consumed by the reaction per 100 parts of lignin and a yield of 7.0% vanillin as sodium vanillinate and based on the weight of the sulfite liquor solids charged had been obtained. This was equivalent to about 13.75% of vanillin based on the lignin content of the sulfite liquor solids charged.

*Example VII*

An autoclave was charged with a liquid reaction mixture as described in Example II and the closed autoclave was heated so that in the first 15 minutes of the heating up period the temperature had reached 120° C. while the partial pressure of the oxygen and the gases contacting the liquid reaction mixture was maintained at about 12.0 pounds per square inch and during which time 16 parts of oxygen were consumed by the reaction per 100 parts of lignin. During the next 15 minute interval, the temperature of the liquid reaction mixture was increased to 151° C. while the partial pressure of the oxygen in the gases contacting the liquid reaction mixture was maintained at about 14.0 pounds per square inch. Thereafter, the reaction was continued while the temperature was maintained at about 152° C. and the partial pressure of the oxygen in the gases contacting the liquid reaction mixture was maintained at about 9.0 pounds per square inch, until a maximum yield of vanillin had been obtained which was at the end of 45 minutes from the time the heating of the autoclave had been begun. At the end of this period it was determined that 35.5 parts of oxygen had been consumed by the reaction per 100 parts of lignin and a yield of 6.1% vanillin, as sodium vanillinate and based on the weight of the waste sulfite liquor solids charged, had been obtained. This is equivalent to about a 12% yield of vanillin based on the lignin content of the waste sulfite liquor solids. The reaction was then continued beyond the point of maximum yield for an additional hour while the temperature was maintained at about 152° C. and the partial pressure of the oxygen at 9.0 pounds per square inch. At the end of this time it was determined that the yield of vanillin had dropped to about 4% based on the weight of the waste sulfite liquor solids charged.

In considering the improved results as indicated by the foregoing examples, it should be borne in mind that the practice of the prior art with regards to a similar type of reaction have produced maximum yields of 6 to 6½% vanillin based on the weight of waste sulfite liquor solids which were reacted upon. Example I shows the increased yield of vanillin that may be obtained by an operation within the preferred conditions of this invention, the partial pressure of the oxygen was maintained above 0.5 pound per square inch, namely, 3.36 pounds per square inch during the heating up period, and thereafter, during the cooking period wherein the temperatures were within the range of 143 to 164° C. the partial pressure of the oxygen was maintained within the range of 0.15 to 0.50 pound per square inch, which is about the middle of the preferred range of 0.075 to 1.5 pounds per square inch. The yield of vanillin, based on the waste sulfite liquor solids charged was 9.7% which reflects substantially a 50% increase in yield over the yields which have been obtained by the practices of the prior art. Example II again illustrates an operation within the preferred improvements of this invention and in Example II a yield of 10.1% vanillin was obtained which is substantially a 55% increase in yield over the yields obtainable by the practices of the prior art. Likewise Example III which was carried out in accordance with the conditions of this invention resulted in a yield of 9.0% vanillin, which indicates about a 30% increase in yield over the yields of the prior art. In Examples IV and V the partial pressure was varied with the temperature of the liquid reaction mixture in accordance with the conditions of this invention, however the total time of the reaction was reduced from 4 hours to 1½ hours. While the total time of the reaction was materially decreased, a yield of 8.3% vanillin was obtained which is about a 30% increase in yield of vanillin over those yields which have been obtained by the prior art. In Example VI the partial pressure of the oxygen was maintained below the desirable partial pressure of 0.5 pound per square inch during the initial heating up period, however, during a predominant portion of the cooking period, that is when the temperatures of the liquid reaction mixture was in excess of 140° C., the partial pressure of the oxygen was maintained within the preferred range of 0.075 to 1.5 pounds per square inch, namely, 0.30 to 0.47 pound per square inch. This example illustrates the unsatisfactory yields which are obtained where the partial pressure of oxygen is not properly controlled during the heating up period. In operating in accordance with the conditions of this invention, the partial pressure should be maintained at or above 0.5 pound per square inch during a substantial portion of the heating up period, that is during the time the temperatures are below 140° C. and thereafter during a predominant portion of the cooking period, that is when the temperatures are within the range of 140 to 185° C. the partial pressure of the oxygen should be maintained within the range of 0.075 to 2.5 pounds per square inch. Observing the recommended limits during both the heating up and cooking period results in greatly increased yields of vanillin over those which have been obtained in the prior art. Example VII was carried out to serve as a basis for comparison and to illustrate the yields which are obtainable where an excessive partial pressure of oxygen is used. In Example VII the partial pressure was maintained within the range of 9 to 14 pounds per square inch during the entire reaction period, which is illustrative of the practice of the art, and there was obtained a maximum yield of 6.1% vanillin, based on the weight waste sulfite liquor solids reacted upon. This yield of 6.1% vanillin is within the range of 6 to 6½% yields which have been obtained in the prior art. When this yield is compared to the yields of 9 to 10% which are obtained when the partial pressure of the oxygen contacting the liquid reaction mixture are maintained at low levels as required by this invention, it is clearly seen how critical the conditions set forth in this invention are, and how greatly the yield of vanillin can be increased by practicing in accordance with this invention rather than practicing in accordance with the teachings of the prior art.

While this invention is primarily directed to the partial oxidative degradation of the complex lignin molecule to produce vanillin, many other valuable co-products are also formed in the course of the production of vanillin, and only economics will determine which products will be of primary or secondary importance. For example, while the process as shown in Example II produced the highest yield of vanillin heretofore obtainable, namely, 10.1% based on the weight of waste sulfite liquor solids reacted upon, there was also produce as a result of the operation of Example II, 25 parts by weight of vanillic acid for each 100 parts by weight of vanillin recovered. The process of this invention is therefore very useful as a process for the manufacture of vanillic acid as well as an excellent process for the production of vanillin. Other valuable co-products which are produced in the course of the production of vanillin by this invention are guaiacol, acetovanillone and oxalic acid; and, when using hardwood waste sulfite liquor, syringaldehyde and syringic acid are valuable co-products.

What is claimed is:

1. In a process for the production of valuable oxidation degradation products from a form of lignin wherein a liquid reaction mixture comprising a strongly alkaline aqueous medium containing lignin or a derivative of lignin is maintained at temperatures up to 185° C. and is contacted with molecular oxygen, the improvement comprising the steps of supplying substantially the entire oxygen requirements for the reaction by intimately contacting the said liquid reaction mixture with a gaseous mixture containing molecular oxygen while maintaining the partial pressure of the molecular oxygen in said gaseous mixture within the range of 0.075 to 2.5 pounds per square inch during the time the temperature of said liquid reaction mixture has a temperature within the range of 140 to 185° C.

2. In a process for the production of vanillin from a form of lignin wherein a liquid reaction mixture comprising a strongly alkaline aqueous medium containing waste sulfite liquor is maintained at temperatures up to 185° C. and contacted with molecular oxygen, the improvement comprising throughout the reaction supplying substantially all of the oxygen requirements for the oxidizing reaction by intimately contacting the said liquid reaction mixture with a gaseous mixture containing molecular oxygen while maintaining the partial pressure of the molecular oxygen in said gaseous mixture above 0.5 pound per square inch during the time the temperature of the liquid reaction mixture is within the range of 100 to 140° C., and during the time the temperature of the liquid reaction mixture is within the range of 140 to 185° C., intimately contacting the said liquid reaction mixture with a gaseous mixture containing molecular oxygen while maintaining the partial pressure of the molecular oxygen in said gaseous mixture within the range of 0.075 to 2.5 pounds per square inch.

3. In a process for the production of vanillin from a form of lignin wherein a liquid reaction mixture comprising a strongly alkaline aqueous medium containing lignin or a derivative of lignin is maintained at temperatures up to 185° C. and is contacted with molecular oxygen, the improvement comprising the steps of supplying substantially all of the oxygen requirements for the portion of the oxidizing reaction during which the temperature of said liquid reaction mixture is within the range of 140 to 185° C. by intimately contacting the said liquid reaction mixture with a gaseous mixture containing molecular oxygen while maintaining the partial pressure of the molecular oxygen in said gaseous mixture within the range of 0.075 to 2.5 pounds per square inch.

4. In a process for the production of vanillin from sulfite waste liquor wherein a liquid reaction mixture comprising a strongly alkaline aqueous solution of caustic soda and sulfite waste liquor is maintained at temperatures up to 170° C. and is contacted with molecular oxygen, the improvement comprising the steps of supplying substantially all of the oxygen requirements for the portion of the oxidizing reaction during which the temperature of said liquid reaction mixture is within the range of 140 to 170° C. by intimately contacting the said liquid reaction mixture with a gaseous mixture containing molecular oxygen while maintaining the partial pressure of the molecular oxygen in said gaseous mixture within the range of 0.075 to 1.5 pounds per square inch.

5. In a process for the production of vanillin from waste sulfite liquors, the steps comprising maintaining the liquid reaction mixture comprising for each part by weight of waste sulfite liquor solids, 7 to 12 parts of water and 0.7 to 1.2 parts of caustic soda, at temperatures up to 185° C. and supplying substantially all of the oxygen requirements for the oxidizing reaction by intimately contacting said liquid reaction mixture with an oxidizing gas containing molecular oxygen while maintaining the partial pressure of the molecular oxygen in said oxidizing gas above 0.5 pound per square inch during the time the temperature of the said liquid reaction mixture is within the range of 100 to 140° C. and during the time the temperature of the liquid reaction mixture is within the range of 140 to 185° C., intimately contacting the said liquid reaction mixture with an oxidizing gas containing molecular oxygen while maintaining the partial pressure of the molecular oxygen in said oxidizing gas within the range of 0.075 to 2.5 pounds per square inch.

6. In a process for oxidizing an aqueous solution of lignin derivatives in the presence of caustic soda under pressure in an autoclave to produce sodium vanillinate by treating the lignin derivatives with oxygen supplied from the air, the improvement which comprises the steps of during the time the said solution of lignin derivatives is at reacting temperatures of continuously supplying substantially all the oxygen for the oxidizing reaction by passing a mixed gas containing air diluted with inert gas whereby the said mixed gas has an oxygen partial pressure below about 6.6 pounds per square inch in the form of fine bubbles through the reacting liquid at pressure greater than the steam pressure while continuously exhausting spent gas from the autoclave.

7. In a process for oxidizing an aqueous solution of lignin derivatives in the presence of caustic soda under pressure in an autoclave to produce sodium vanillinate by treating the lignin derivatives with oxygen supplied from air, the improvement which comprises the steps of during the time the said solution of lignin derivatives is at reacting temperatures of continuously introducing substantially all of the air requirements for the oxidizing reaction into the vapor space of the autoclave at pressures greater than the steam pressure within the autoclave, mixing the air with the other gases in said vapor space to form an oxygen-containing gaseous mixture having an oxygen partial pressure below 6.6 pounds per square inch, continuously passing said oxygen-containing gaseous mixture from the vapor space and through the aqueous solution of lignin derivative in the form of fine bubbles while continuously injecting air into said vapor space of the autoclave and exhausting spent gases from the vapor space of the autoclave.

8. In a process for the production of valuable oxidation degradation products from a form of lignin wherein a reaction mixture comprising a strongly alkaline aqueous medium containing lignin or a derivative of lignin is contacted and reacted with molecular oxygen, the improvement which comprises the steps of, during the time the said reaction mixture is at reacting temperatures, continuously supplying substantially all of the oxygen for the oxidation reaction by intimately contacting said reaction mixture with an oxygen-containing gas having an oxygen partial pressure below about 6.6 pounds per square inch.

References Cited in the file of this patent

UNITED STATES PATENTS

| Number | Name | Date |
|---|---|---|
| 2,434,626 | Salvesen et al. | Jan. 13, 1948 |
| 2,516,827 | Marshall et al. | July 25, 1950 |
| 2,544,999 | Marshall et al. | Mar. 13, 1951 |
| 2,576,752 | Fisher et al. | Nov. 27, 1951 |
| 2,576,754 | Fisher et al. | Nov. 27, 1951 |

FOREIGN PATENTS

| Number | Country | Date |
|---|---|---|
| 607,978 | Great Britain | Sept. 8, 1948 |

OTHER REFERENCES

Ser. No. 318,386, Freudenberg et al. (A. P. C.), published Apr. 20, 1943.